United States Patent [19]

Dumontet et al.

[11] Patent Number: 4,668,031
[45] Date of Patent: May 26, 1987

[54] CONDUCTOR RAIL HAVING AN EXPANSION JOINT

[75] Inventors: Max Dumontet, Pantin; Yves Pelletier, Les Mureaux, both of France

[73] Assignee: Delachaux S.A., Gennevilliers Cedex, France

[21] Appl. No.: 805,067

[22] Filed: Dec. 4, 1985

[30] Foreign Application Priority Data

Dec. 7, 1984 [FR] France ................. 84 18716

[51] Int. Cl.$^4$ ........................................... H01R 41/00
[52] U.S. Cl. .............................. 339/9 E; 191/29 R
[58] Field of Search ............ 339/9; 191/22 DB, 29 R, 191/29 DM, 44, 44.1; 174/99 E

[56] References Cited

U.S. PATENT DOCUMENTS 3,689,713  9/1972  Shkredka ............... 174/99 E X

FOREIGN PATENT DOCUMENTS 2148994  4/1973  Fed. Rep. of Germany .... 191/29 R

Primary Examiner—Eugene F. Desmond
Attorney, Agent, or Firm—Alan H. MacPherson; Steven F. Caserzal; Thomas S. MacDonald

[57] ABSTRACT

The invention relates to a conductor rail having at least one expansion joint between rigid section bars and presenting a friction shoe with a conductive guidance and friction path. In accordance with the invention, the free ends of the section bars have respective systems of interfitting parallel plates suitable for providing an expansion joint which ensures guidance continuity and electrical pickup continuity regardless of the relative longitudinal position of the section bars. Such conductive rails may be used to feed electricity to handling equipment such as cranes, travelling cranes, and container lifters.

13 Claims, 4 Drawing Figures

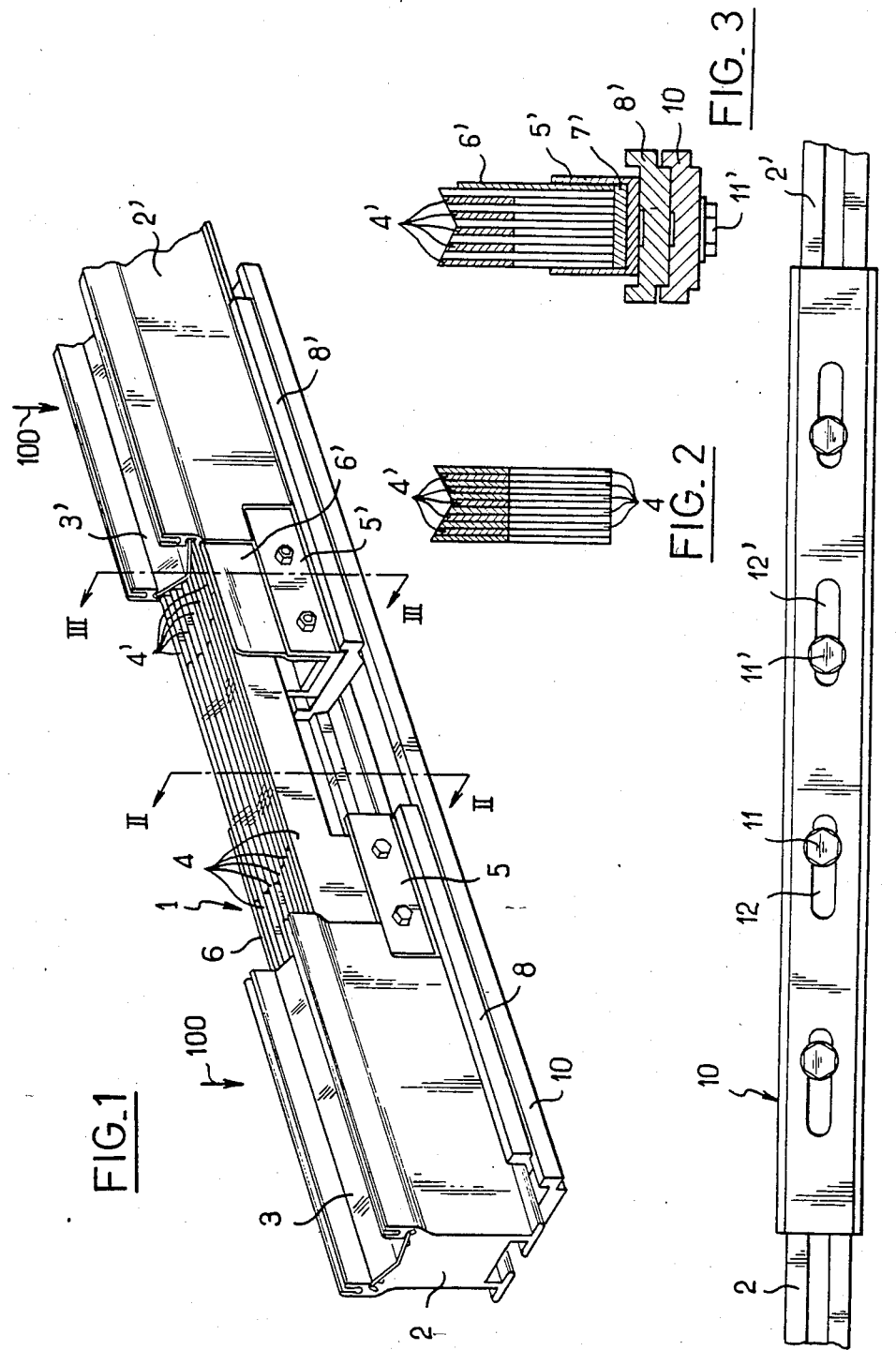

CONDUCTOR RAIL HAVING AN EXPANSION JOINT

The present invention relates to a conductor rail having expansion joints, in particular for feeding electricity to handling equipment.

BACKGROUND OF THE INVENTION

The invention is particularly applicable to contact rails which may be at ground level or suspended at a height, for supplying electricity to handling equipment such as cranes, travelling cranes, container lifters, etc. Generally speaking such conductor rails comprise rigid section bars which serve both as a conductive path and as a guide path for a pickup friction shoe.

Expansion joints must be provided, and numerous solutions have been proposed for ensuring electrical continuity (i.e. pickup continuity) and mechanical continuity (i.e. guidance continuity) at said expansion joints.

One solution consists of providing an empty space between the rail components and in providing two friction shoes on a carriage so that one or other of the shoes is always in contact with the track on a rail even when the other shoe is over empty space, thereby ensuring continuity in electrical pickup when the carriage passes over an expansion joint. This solution is unsatisfactory, both technically and economically. In order to improve it, and in particular to avoid the shocks to which the shoes are subjected when they pass over the expansion joint gap, proposals have been made to provide a pickup track having a transition curve between two adjacent rail components, and to provide the carriage with two friction shoes capable of rocking relative to the carriage. The curved track then serves to raise one of the shoes from its initial position while the other shoe ensures electrical continuity, and the carriage passes more easily over the expansion joint. However, this complicates the pickup shoe assembly, thereby increasing manufacturing costs.

Other solutions have been directed towards the expansion joint between the free ends of two adjacent section bars, providing that the free ends remain in contact with each other in such a manner as to ensure electrical pickup continuity regardless of their relative longitudinal positions. Thus, for example, one proposal consists of providing a notch at the end of the conductor bar and extending halfway across the conductive path, enabling two half-section bars to run side-by-side over a transition zone, thereby providing pickup from both bars in common over said transition zone. A variant on the same principle is to provide a central slidably mounted fishplate which is preferably slidably received at both ends in the end portions of two adjacent conductor bars, thereby providing a relatively rigid transition zone over which electrical pickup continuity is ensured. These various solutions are illustrated, for example, in German published patent specification No. 2 159 087.

Such a solution is better than the previous solutions, but it still suffers drawbacks. The worst of these drawbacks is the loss of shoe guidance over the expansion joint. For example, if a V-shaped path is used to provide such guidance, the full V-shape is available only in the overlapping middle portion of the expansion joint, with each end of the expansion joint having a gap in one of the sides of the V. In particular, when a contact shoe passes over such an expansion joint it suffers shocks due to a gap first on one side and then on the other side of the V. These shocks increase the rate at which shoes wear, and the regular, repetitive nature of such shocks gives rise to fatigue in the shoe-supporting mechanisms.

The discontinuity due to the expansion joint cannot be eliminated since the length of the common pickup zone is a function of the differences observed between the minimum and the maximum temperatures in use and the linear expansion coefficients of the conductor bar components. Under all circumstances some kind of expansion joint gap must be provided. In order to provide mechanical continuity and in particular continuity of rigidity, it is necessary either to provide a system of side fishplates or else to provide a special connection between section bars to bridge the expansion joint. In spite of such techniques, lateral contact between the notched ends of the bar components is not always as good as is desirable.

Proposals have also been made to use provisional connection fittings between the section bars so as to facilitate transport operations. Such fittings must be removed before the bars are used as a contact rail; otherwise, there would not be an expansion joint between adjacent rail components. This solution is not reliable since there is always the risk that workmen might forget to remove a fitting.

A further attempt at reducing the effects of discontinuity between rail components is illustrated in French published patent specification 2 238 802 which describes a guide rail for air-cushioned vehicles including expansion joints comprising two vertical half-section parts having bevelled ends in order to provide improved thrust contact by providing a zig-zag transition zone.

Preferred embodiments of the present invention provide a conductor rail component having an expansion joint which avoids the above-mentioned drawbacks of the prior art, in which the expansion joint is effective for providing both electrical and mechanical continuity.

Preferred embodiments of the present inention also provide optimum guidance for a friction shoe as it passes over an expansion joint without generating unwanted shocks and/or noise.

Preferred embodiments of the invention also provide conductor rails of considerable length ready for installation which are not excessively expensive, and in particular which are considerably cheaper than existing solutions including a curved lift-off track.

SUMMARY OF THE INVENTION

The present invention provides a conductive rail component having an expansion joint, in particular for supplying electricity to handling equipment, said rail component comprising rigid section bars each providing a conductive guidance and friction track for a friction shoe, the expansion joint comprising by the free ends of two adjacent section bars, said free ends being in contact with each other to provide guidance continuity and electrical pickup continuity regardless of their relative longitudinal positions, wherein the free ends of the section bars comprise systems of interfitting parallel plates, with each bar end plate coming in contact with one or two of the adjacent plates at the free end of an adjacent bar over a central zone of the expansion joint.

Preferably, the plates are oriented in a direction which is substantially parallel to the direction in which a friction shoe presses against the conductive tracks.

Preferably, the sides of the plates which engage a friction shoe constitute an extension of the conductive tracks over the entire length of the expansion joint, and are such that the central zone of the expansion joint offers a continuous contact surface to a friction shoe, said surface having substantially the same shape as the contact face of the conductive tracks themselves.

In particular, when the conductive rail has a conductive track which is essentially concave (i.e. having a V-shape) or convex (i.e. having an upsidedown V-shape), it is advantageous for the expansion joint to have a similar concave or convex contact surface directly extending the conductive track of the adjacent rigid rail-constituting bars.

The conductive rail may additionally include, on the opposite side of the section bars from the conductive track, a fitting for interconnecting pairs of adjacent conductor bars across the expansion joint allowing relative longitudinal sliding between the section bars while ensuring that said section bars retain their alignment. The sliding connection may be provided between the fitting and an intermediate guiding slideway fixed to the associated section bar, and the connection fitting may have longitudinal slots for receiving projecting members fixed on the intermediate guidance slideway or on the rigid section bars themselves.

The invention relates both to rectilinear conductive rails and to curved conductive rails. When the rails are rectilinear, the interfitting parallel plates are themselves rectilinear for relative rectilinear longitudinal movement in the expansion joint, whereas when the rails are curved, the interfitting parallel plates are curved with the same center of curvature as the section bars in order to allow for curvilinear longitudinal relative movement at the expansion joints.

Finally, the invention also relates to a conductive rail including a plurality of expansion joints. Such a rail is unusual in that it constitutes a functional member ready to be put into place and already including a predetermined number of expansion joints chosen as a function of the total length of the rail to be installed.

BRIEF DESCRIPTION OF THE DRAWING

An embodiment of the invention is described by way of example with reference to the accompanying drawing, in which:

FIG. 1 is a perspective view of a conductor rail including an expansion joint in accordance with the invention;

FIG. 2 is a cross-section through a portion of the FIG. 1 rail taken on a line II—II, showing the central zone of the expansion joint where the parallel plates from both ends of the joint overlap;

FIG. 3 is a cross-section on line III—III of FIG. 1, showing another zone of the expansion joint in which the parallel plates from one end only of the joint are present: and FIG. 4 is a view of the bottom of the rail shown in FIG. 1, showing one example of a sliding connection between rail components.

DESCRIPTION OF PREFERRED EMBODIMENT

FIG. 1 shows a preferred embodiment of the invention. It comprises a conductive rail component 1 including an expansion joint and is suitable for providing a power supply line to handling equipment (cranes, overhead cranes, container lifters, etc.). The conductive rail 1 is manufactured from rigid section bars 2, 2' made, for example, of aluminum, and provides a friction shoe (not shown) with a conductive guide and friction path 3, 3'.

The paths shown in the example comprise a concave strip having a V-shaped cross-section snap-fitted to the rigid section bars. It should be understood that the problem of electrical continuity over an expansion joint is essentially a problem of pickup continuity, since electrical continuity per se between the section bars themselves is ensured in a conventional manner by a length of interconnecting conductive braid or flexible cable (not shown).

In accordance with a fundamental aspect of the present invention, the free ends of the section bars 2, 2' have respective systems of parallel plates 4, 4' suitable for interfitting with each other, thereby constituting an expansion joint with each end plate on a section bar being in contact with one or two adjacent end plates on the adjacent end of the next section bar, at least in a central zone of the expansion joint.

It should be observed that the parallel plates could be organized to occupy planes perpendicular to the direction in which the friction shoes are pressed against the conductive tracks (arrows 100). In this case, the end plate would be interfitting V-shaped plates having a cross-section similar to that of the conductive tracks, and only the uppermost plate would actually make contact with a friction shoe. However, organizing the system of plates so that they lie substantially parallel to the direction in which a friction shoe is applied thereto, as shown in the present case, has several important advantages. In particular, the edges of the plates 4, 4' which come into contact with a friction shoe may be disposed to lie directly in line with the conductive tracks 3, 3' over the entire length of the expansion joint.

The central zone of the expansion joint thus presents a continuous contact surface (FIG. 2) having substantially the same shape (i.e. V-shaped in this case) as the conductive tracks themselves. The adjacent zones which are only partially filled, since they are occupied by the parallel plates from the end of one section bar only, still retain the V-shape guiding sprofile as can be seen in FIGS. 2 and 3, thus ensuring that there is no guidance discontinuity when a shoe passes over the expansion joint. This is most advantageous for avoiding unwanted shocks and/or noise during such passages, with electrical pickup continuity being likewise ensured with a high degree of reliability.

Naturally, the system of parallel plates which interfit like two facing combs may have various numbers of plates depending on the type of contact face required, with the minimum possible numbers of plates being a single plate on the end of one section bar being received between two end plates on another section bar. The system shown in the drawings comprise two sets of five plates each, thereby ensuring that the V-shaped contour is properly defined at all points along the expansion joint by virtue of the shoe-contacting edges of the plates being suitably chamfered, with this being particularly true in the end portions of the expansion joint which are occupied by only one of the two sets of plates. The plates are made of a material which is a good conductor of electricity, for example copper or an alloy of copper.

Similarly, the shoe-engaging section of the track which is a concave V-shape in the present example could have some other shape, for example a convex upsidedown V-shape or an arcuate shape, with the plates being appropriately shaped by suitable chamfering in each case (and with the friction shoe naturally having a suitable complementary shape).

As shown, the system of plates may be mechanically reinforced by means of U-shaped brackets 5, 5' each of which receives one series of parallel plates, together with side conductive plates 6, 6' and base conductive plates 7, 7' (the base plate 7 is not actually visible in the figures, but the reference is used to underline the symmetrical nature of the connection). Furthermore, each section bar 2, 2' is fixed to an intermediate guide slideway 8, 8' with the U-shaped brackets 5, 5' pressing directly against the associated slideway. Finally, the conductive rail 1 includes a connection fitting 10 interconneting the section bars end-to-end, with connection fitting 10 allowing the section bars 2, 2' to slide longitudinally relative to each other, e.g. by means of bolts 11, 11' passing through oblong slots 12, 12' through the connection fitting 10. Sliding takes place between the intermediate slideways 8, 8' and the connection fitting 10, and a conductive lubricating grease is preferably interposed therebetween.

The connection fitting 10 is put into place when the rails are assembled in the factory, thereby ensuring that the assembled bars are mechanically strong at the expansion joints and facilitating transport without risk to the interfitting end plates. However, and this is an important difference compared to the prior art, the connection fitting 10 should not be disassembled since its essential function is to ensure mechanical continuity and to conserve mechanical alignment across the expansion joint once the bars have been assembled.

It is thus possible, in accordance with the invention, to provide a conductor rail which comprises a plurality of section bars which are interconnected by expansion joints, the rail as a whole constituting a single unit for installation purposes having a number of expansion joints which is predetermined as a function of the overall length of the rail to be provided.

It should be observed that transverse expansion of the plates is completely negligible and there is no danger of jamming or clamping between adjacent interfitted plates.

The embodiment described and shown comprises a rectilinear rail for which the interfitting parallel plates are likewise rectilinear in order to allow for relative longitudinal rectilinear movement at the expansion joint. However, within the scope of the invention, the rail could be curved, in which case the parallel interfitting plates should likewise be curved and have the same center of curvature as the interconnected section bars to provide for longitudinal curvilinear relative movement at the expansion joints.

The invention is not limited to the embodiment described above, but covers any variant thereof which falls within the scope of the claims.

We claim:

1. A conductive rail component having an expansion joint, for supplying electricity to handling equipment, said rail component comprising rigid section bars each providing a conductive guidance and friction track for a friction shoe, the expansion joint comprising the free ends of two adjacent section bars, said free ends being in contact with each other to provide guidance continuity and electrical pickup continuity regardless of their relative longitudinal positions, wherein each of the free ends of each of the section bars comprise a multiplicity of spaced parallel plates, with each bar end plate upon assembly coming into interfitting contact with one or two of the adjacent plates at the free end of an adjacent bar over a central zone of the expansion joint.

2. A conductive rail according to claim 1, further including a connection fitting connected to the rigid section bars on their sides opposite to the conductive track, said fitting interconnecting two adjacent section bars across the expansion joint, said connection allowing relative longitudinal sliding between the section bars over said fitting while ensuring constant alignment of said section bars.

3. A conductive rail according to claim 1, wherein the plates are oriented in a direction which is substantially parallel to the direction in which a friction shoe presses against the conductive paths.

4. A conductive rail according to claim 3, wherein the edges of the plates which engage a friction shoe constitute extensions of the conductive paths over the entire length of the expansion joint.

5. A conductive rail according to claim 4, wherein the edges of the plates are such that the central zone of the expansion joint provides the friction shoe with a continuous contact surface having substantially the same shape as the contact face of the conductive paths.

6. A conductive rail according to claim 5, and having a conductive path which is concave, and in particular which is generally V-shaped, wherein the expansion joint presents a concave contact surface of similar shape which directly extends the conductive paths of the adjacent rigid section bars.

7. A conductive rail according to claim 5, and having a conductive path which is convex, and in particular which is generally V-shaped, wherein the expansion joint presents a convex contact surface of similar shape which directly extends the conductive paths of the adjacnet rigid section bars.

8. A conductive rail component having an expansion joint, for supplying electricity to handling equipment, said rail component comprising rigid section bars each providing a conductive guidance and friction track for a friction shoe, the expansion joint comprising the free ends of two adjacent section bars, said free ends being in contact with each other to provide guidance continuity and electrical pick-up continuity regardless of their relative longitudinal positions, wherein the free ends of the section bars comprise systems of interfitting parallel plates, with each bar end plate coming in contact with one or two of the adjacent plates at the free end of an adjacent bar over a central zone of the expansion joint, wherein the parallel plates are fixed to a bracket which is itself fixed to the free end of the associated rigid section bar.

9. A conductive rail according to claim 7, further including a connection fitting connected to the rigid section bars on their sides opposite to the conductive track, said fitting interconnecting two adjacent section bars across the expansion joint, allowing relative longitudinal sliding between the section bars over said fitting while ensuring constant alignment of said section bars, wherein an intermediate guide slideway is fixed to an associated rigid section bar such that a sliding connection is provided between said connection fitting and said slideway.

10. A conductive rail according to claim 9, wherein the connection fitting has longitudinal slots and the slideway is provided with projections which fit into the slots and can slide in the slots.

11. A conductive rail according to claim 10 comprising a plurality of expansion joints in accordance therewith, said rail constituting a functional unit for installation as a whole, the number of said plurality of expansion joints being determined by the total length of said rail.

12. A curved conductive rail having an expansion joint, for supplying electricity to handling equipment, said rail comprising rigid section bars each providing a conductive guidance and friction track for a friction shoe, the expansion joint comprising the free ends of two adjacent bars, said free ends being in contact with each other to provide guidance continuity and electrical pickup continuity regardless of their relative longitudinal positions, wherein the free ends of the section bars comprise systems of interfitting concentric plates, with each bar and plate coming in contact with one or two of the adjacent plates at the free end of an adjacent bar over a central zone of the expansion joint to enable curvilinear longitudinal relative movement at the expansion joint.

13. A conductive rail comprising a plurality of expansion joints in accordance with claims 1, 2, 3, 4, 5, 6, 7, 8, 9 or 12, said rail constituting a functional unit relative for installation as a whole, and having a number of said expansion joints which is predetermined as a function of the total length of the rail to be installed.

* * * * *